United States Patent Office 3,395,031
Patented July 30, 1968

3,395,031
BURNED BASIC REFRACTORY
William W. Campbell, E. 6th St., Ludington, Mich.
49431; Albert H. Pack, Pittsburgh, Pa. (5732 E. 6th St.,
Ludington, Mich. 49431); and Ben Davies, 5132 Caste
Drive, Pittsburgh, Pa. 15236
No Drawing. Filed Jan. 5, 1966, Ser. No. 518,778
4 Claims. (Cl. 106—58)

ABSTRACT OF THE DISCLOSURE

Burned magnesite brick made from a size graded batch having a minus 65 mesh fraction prepared from magnesite having an average crystal size of at least 200 microns.

---

The vessels used for the manufacture of steel are commonly lined with basic refractory brick; such as, magnesite, magnesite-chrome ore, and chrome ore compositions. Brick made of burned dolomite, sometimes mixed with magnesite, are often used. These brick are preferred because of their general good resistance to basic slags which are present in the steelmaking processes. In the new basic oxygen steelmaking process, the severity of the slag attack is considerably greater than in the older processes. Therefore, there is a need for basic refractory brick with increased slag resistance.

It is an object of this invention to provide a burned magnesite brick having increased resistance to slag attack by steelmaking slags.

It is another object of this invention to provide a burned magnesite brick made from nonfused grain, the finer fractions of which are prepared from a novel magnesite grain having an average periclase crystal size in excess of 200 microns.

It is another object of this invention to provide a magnesite useful in refractory brick, which has an average crystal size in excess of 200 microns, and method of making such grain.

Briefly, according to one aspect of this invention, a burned magnesite brick is made from a batch of nonfused dead burned magnesite (periclase) containing in excess of about 90% MgO, on an oxide basis, and having a bulk specific gravity in excess of 3.00. The batch is size graded for brickmaking, and includes a coarse fraction and a fine fraction. The coarse fraction is normally sized so that 20–40% by weight, of the total batch is −4 +10 mesh (Tyler) and 25–45%, by weight, of the total batch is −10 +28 mesh. In other words, the total coarse fraction, that is, minus 4 plus 28 mesh is from 55 to 75% of the batch. The fines fraction being from 25 to 45%, by weight of the batch, comprises dead burned magnesite that is prepared from a grain having an average crystal size in excess of 200 microns. The fines fraction is normally ball milled fines which are substantially all −65 mesh. From 40 to 60% of the −65 mesh material also passes a 325 mesh screen. The brick are preferably tar-impregnated, particularly when intended for the oxygen process.

In this specification, the term "crystal size" has a meaning well known throughout the refractories art. It pertains to the microscopic crystals that combine to form a macroscopic grain. The common procedure for measuring the average crystal size within a grain is by use of the microscope. Generally, an index of the crystal size is obtained by measuring the largest crystal on a random line drawn across the grain. This is repeated many times by scanning the grain across as many as 50 lines, each time measuring the diameter of the largest crystal intercepted. An average of these measurements is normally reported on the average crystal size. It should be pointed out that this index is based on the assumption that all periclase crystals in a given grain, are approximately the same size and approximately spherical, and in consequence the largest indicated crystal may in fact be the only one sectioned through its greatest diameter.

According to another aspect of this invention, a dead burned magnesite grain is provided having an average crystal size in excess of at least about 200 microns by repeatedly passing the grain through a shaft kiln with a hot zone in excess of about 3000° F. until the desired crystal size is obtained.

This invention is more clearly understood by reference to the following examples. In Example A, a size graded batch of magnesite grain was prepared in which 30%, by weight, was −4 +10 mesh, 35%–10+28 mesh, and the remainder ball milled fines. The magnesite grain used in Example A was passed through a shaft kiln once to be dead burned. The average crystal size was 125 microns. The batch was tempered with about 5% lignin liquor, and pressed into brick at about 8000 p.s.i. The brick were burned at cone 23, which is about 2820° F., with a 10-hour hold. After burning, the brick were tar-impregnated. Example B was made in the same manner as Example A. However, the magnesite used in the batch of Example B had been passed through the shaft kiln twelve times. It had a crystal size of 210 microns. Example C was prepared similarly to Examples A and B. The coarse fraction (that is, the −4 +28 mesh fraction and the −10 +28 mesh fraction) contained magnesite having an average crystal size of 125 microns. The ball milled fines fraction was prepared from magnesite grains which had an average crystal size of 210 microns.

The brick were then subjected to testing for bulk density and apparent porosity. They were also subjected to a dynamic slag test which simulates the slag attack in the basic oxygen steelmaking vessel. In this test, molten slag is dripped across a test sample which is inclined 30° from the horizontal. The sample is maintained at 2900° F. in a reducing atmosphere. Approximately 50 grams of slag having a composition similar to early slag present in the oxygen steelmaking vessel is dripped on the sample. Then 50 grams of late slag are dripped across the sample. In this manner, the early and late slags are alternately dripped across the sample until approximately 800 grams total have been used. The chemical analyses of the early and late slags normally used in this test are given below:

| | Early Slag, percent | Late Slag, percent |
|---|---|---|
| Silica ($SiO_2$) | 23.7 | 18.6 |
| Alumina ($Al_2O_3$) | 2.3 | 2.4 |
| Titania ($TiO_2$) | 2.2 | 2.3 |
| Iron Oxide ($Fe_2O_3$) | 11.0 | 20.2 |
| Lime (CaO) | 40.2 | 42.6 |
| Magnesia (MgO) | 5.0 | 7.5 |
| Manganese (MnO) | 5.4 | 4.6 |
| Phosphorous ($P_2O_5$) | 1.2 | 1.8 |

The composition of the batches of Examples A, B, and C, physical properties of the brick made from these batches, and the results of the dynamic slag test on them are given in Table I below:

TABLE I

| Example | A | B | C |
|---|---|---|---|
| Magnesite (one pass through shaft kiln, average crystal size 125 microns): | | | |
| −4 +10 mesh, percent | 30 | | 30 |
| −10 +28 mesh, percent | 35 | | 35 |
| Ball Milled Fines (nominally −65 mesh), percent | 35 | | |
| Magnesite (twelve passes through shaft kiln, average crystal size 210 microns): | | | |
| −4 +10 mesh, percent | | 30 | |
| −10 +28 mesh, percent | | 35 | |
| Ball Milled Fines, percent | | 35 | 35 |
| Bulk Density, p.c.f. (Av. 8) | 182 | 182 | 181 |
| Apparent Porosity, percent | 17.2 | 17.7 | 18.4 |
| Dynamic Slag Test at 2,900° F. alternately using 50 grams each of early and late slag to a total of 800 grams: Volume Erosion, cc | 24 | 16 | 12 |

Table I establishes that the slag resistance of brick made with magnesite grain having an increased crystal size is superior to conventional brick (Compare Examples A and B.). Table II also establishes that it is only necessary for the magnesite with the increased average crystal size to be in the fine fraction.

To corroborate the results given in Table I, another series of examples was made. However, in this work a different measure of the crystal size was used. It is known that grains having a coarser crystal size have lower surface areas. Therefore, a measure of the surface area is a relative measure of crystal size. Surface area was determined in this work by the well known gas adsorption technique.

Examples D, E, F, and G were made similarly to Examples A, B, and C. The ball milled fines used in Example D were passed through the shaft kiln once, which is the normal procedure. The ball milled fines used in Example E were made from magnesite that had been passed through the shaft kiln five times, those used in Example F were passed through the shaft kiln ten times, and those used in Example G were passed through the shaft kiln fifteen times. The batches of Examples D, E, F, and G, some physical properties of the brick made therefrom, and the surface area of the magnesite used in preparing the ball milled fines are given in Table II.

TABLE II

| Example | D | E | F | G |
|---|---|---|---|---|
| Base Mix: Magnesite (one pass through shaft kiln): | | | | |
| −4 +10 mesh, percent | 30 | 30 | 30 | 30 |
| −10 +28 mesh, percent | 35 | 35 | 35 | 35 |
| Ball Milled Fines: | | | | |
| (One pass through shaft kiln) | 35 | | | |
| (Five passes through shaft kiln) | | 35 | | |
| (Ten passes through shaft kiln) | | | 35 | |
| (Fifteen passes through shaft kiln) | | | | 35 |
| Bulk Density, p.c.f. (Av. 10) | 179 | 181 | 181 | 180 |
| Apparent Porosity (Av. 3), percent | 18.6 | 17.8 | 17.8 | 17.8 |
| Surface area of 4 +10 mesh magnesite used to prepare the ball milled fines, sq. cm./gm. (gas adsorption technique) | 409 | 284 | 277 | 265 |

Table II establishes that the surface area of magnesite grains decreases by repassing it through the shaft kiln. Therefore, the crystal size is increased. The largest increase in crystal size appears to occur during the first five passes. Thus, the method of this invention consists essentially of the process of U.S. Patent No. 3,060,000, in which the magnesite briquettes are passed through or subjected to an elevated dead burning temperature until the surface area of resulting grain is reduced (because of crystal growth), by at least about ¼ the surface area of grain subjected but once to such a dead burning temperature.

In additional test work, Examples D and G, brick were subjected to dynamic slag tests similar to the testing reported in Table I (except that only 600 grams total of slag was used), and the slag erosion of Example D was almost twice that of Example G.

The brick of Example A through G were impregnated with cokable, nonaqueous, carbonaceous material by immersion in the carbonaceous material, generally heated to about 400° F. The heated and liquefied carbonaceous material easily penetrated throughout the brick. Commercially available tar or pitch of petroleum or coal base can be used for impregnation. Generally, we suggest a coal-base pitch having a softening point on the order of 150° F.

The bulk specific gravity and the chemical analyses of the magnesites used in Mixes A through G are given below:

| Examples | A, B, and C | D, E, F, and G |
|---|---|---|
| Chemical Analysis, percent: | | |
| Silica ($SiO_2$) | 0.7 | 0.48 |
| Alumina ($Al_2O_3$) | 0.3 | 0.30 |
| Iron Oxide ($Fe_2O_3$) | 0.3 | 0.28 |
| Lime (CaO) | 0.8 | 1.85 |
| Magnesia (MgO) | 98.0 | 97.09 |
| Bulk Specific Gravity | 3.30 | 3.30 |

The magnesite grain used in the preparation of the exemplary mixes, which magnesite grains were designated as one-pass products, was prepared according to the method taught in U.S. Patent No. 3,060,000, assigned to the same assignee. The multi-pass grains were prepared similarly, but passed back through the shaft kiln until the desired crystal size was obtained. All of these grains are, thus, "synthetic," in that the MgO values are initially obtained from a solution of soluble magnesium values.

Having thus described the invention in detail and with sufficient particularity as to enable those skilled in the art to practice it, what is desired to have protected by Letters Patent is set forth in the following claims:

We claim:

1. A burned magnesite brick of improved slag resistance, said brick made from a batch consisting essentially of dead burned, non-fused, magnesite grain, said batch having a coarse and a fine fraction, said coarse fraction comprised of minus 4 plus 28 mesh grain, said fines fraction comprising from 25 to 45% of the batch and being substantially all minus 65 mesh, said fines fraction consisting essentially of magnesite prepared from a grain having an average crystal size of at least 200 microns.

2. The brick of claim 1 in which the coarse fraction is sized so that 20 to 40%, by weight, of the batch is −4 +10 mesh and 25 to 45% of the batch is −10 +28 mesh, the fines fraction constituting from 25 to 45% of the batch and being ball milled fines.

3. The brick of claim 1 in which the dead burned, non-fused, grain contains more than about 90% MgO on an oxide analysis and has a bulk specific gravity in excess of 3.00.

4. The brick of claim 1 impregnated throughout with nonaqueous, cokable, carbonaceous material.

References Cited

UNITED STATES PATENTS 3,276,882  10/1966  Buntenback et al. _____ 106—58

FOREIGN PATENTS 14,288  8/1963  Japan.
1,001,604  8/1965  Great Britain.

JAMES E. POER, *Primary Examiner.*